United States Patent
Kobayashi et al.

(10) Patent No.: US 9,436,218 B2
(45) Date of Patent: Sep. 6, 2016

(54) ELECTRONIC DEVICE

(75) Inventors: Hiroki Kobayashi, Daito (JP);
Hiroyuki Okamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/416,231

(22) Filed: Mar. 9, 2012

(65) Prior Publication Data

US 2012/0229374 A1 Sep. 13, 2012

(30) Foreign Application Priority Data

Mar. 11, 2011 (JP) .................................. 2011-053835

(51) Int. Cl.
*G06F 3/041* (2006.01)
*G06F 1/16* (2006.01)
*G06F 3/0488* (2013.01)
*G06F 3/14* (2006.01)

(52) U.S. Cl.
CPC ............. *G06F 1/162* (2013.01); *G06F 3/0488* (2013.01); *G06F 3/1423* (2013.01)

(58) Field of Classification Search
CPC .................... G09G 2360/04; G09G 2300/02; G09G 2300/026; G06F 3/1423; G06F 3/1431; G06F 3/1446; G06F 3/147; G06F 3/0488; G06F 3/04883; G06F 3/044; G06F 3/04886; G06F 3/045; G06F 1/162; G06F 3/041
USPC ....... 345/1.1–1.3, 2.1–2.3, 3.1–3.3, 173–179
See application file for complete search history.

(56) References Cited

U.S. PATENT DOCUMENTS

| | | | |
|---|---|---|---|
| 2005/0083642 A1* | 4/2005 | Senpuku et al. .............. | 361/681 |
| 2006/0033724 A1 | 2/2006 | Chaudhri et al. | |
| 2006/0211454 A1* | 9/2006 | Park et al. .................... | 455/566 |
| 2007/0085759 A1* | 4/2007 | Lee et al. ....................... | 345/1.1 |
| 2008/0207273 A1* | 8/2008 | Huo .............................. | 455/566 |
| 2010/0066698 A1* | 3/2010 | Seo .............................. | 345/173 |
| 2010/0110010 A1* | 5/2010 | Choi ............................ | 345/169 |
| 2010/0184485 A1* | 7/2010 | Kim ............................ | 455/566 |
| 2010/0187662 A1* | 7/2010 | Choi et al. .................... | 257/656 |

(Continued)

FOREIGN PATENT DOCUMENTS

| | | |
|---|---|---|
| JP | H06-202606 A | 7/1994 |
| JP | H09-330175 A | 12/1997 |

(Continued)

OTHER PUBLICATIONS

Office Action mailed on Mar. 4, 2014 and issued by Japanese Patent Office for Japanese Patent Application No. 2011-053835.

(Continued)

*Primary Examiner* — MD Saiful A Siddiqui

(57) ABSTRACT

An electronic device and methods are disclosed. The electronic device comprises a plurality of display screens, an operation module, and a control module. The operation module is operable to be operated by a user, and the control module is electrically coupled to the display screens and the operation module, and comprises an operation display module. The operation display module is operable to display an active application from among a plurality of applications running on a first display screen from among the display screens. The operation display module is further operable to display operable information related to the active application on a second display screen, when the operation module is operated by the user.

9 Claims, 19 Drawing Sheets

(56) References Cited

U.S. PATENT DOCUMENTS

| | | | |
|---|---|---|---|
| 2010/0207903 A1* | 8/2010 | Kim et al. | 345/173 |
| 2010/0227650 A1* | 9/2010 | Kim et al. | 455/566 |
| 2011/0018821 A1 | 1/2011 | Kii | |
| 2011/0078272 A1* | 3/2011 | Tamai et al. | 709/206 |
| 2011/0109567 A1* | 5/2011 | Kim | 345/173 |
| 2011/0187662 A1* | 8/2011 | Lee et al. | 345/173 |
| 2011/0193805 A1* | 8/2011 | Park et al. | 345/173 |

FOREIGN PATENT DOCUMENTS

| | | | | |
|---|---|---|---|---|
| JP | 10-177430 | | 6/1998 | |
| JP | 2006-279361 | | 10/2006 | |
| JP | 2009-008925 | | 1/2009 | |
| JP | 2009-509235 A | | 3/2009 | |
| JP | 2010-250465 | | 11/2010 | |
| WO | WO 03/077097 | | 9/2003 | |
| WO | WO 03/077553 | | 9/2003 | |
| WO | WO 2006/123211 | * | 11/2006 | H04M 1/02 |
| WO | WO 2010/113457 | * | 10/2010 | |

OTHER PUBLICATIONS

Office Action mailed on Oct. 28, 2014 and issued by Japanese Patent Office for Japanese Patent Application No. 2011-053835.

Office Action mailed on Mar. 22, 2016 and issued by Japanese Patent Office for Japanese Patent Application No. 2015-097506.

* cited by examiner

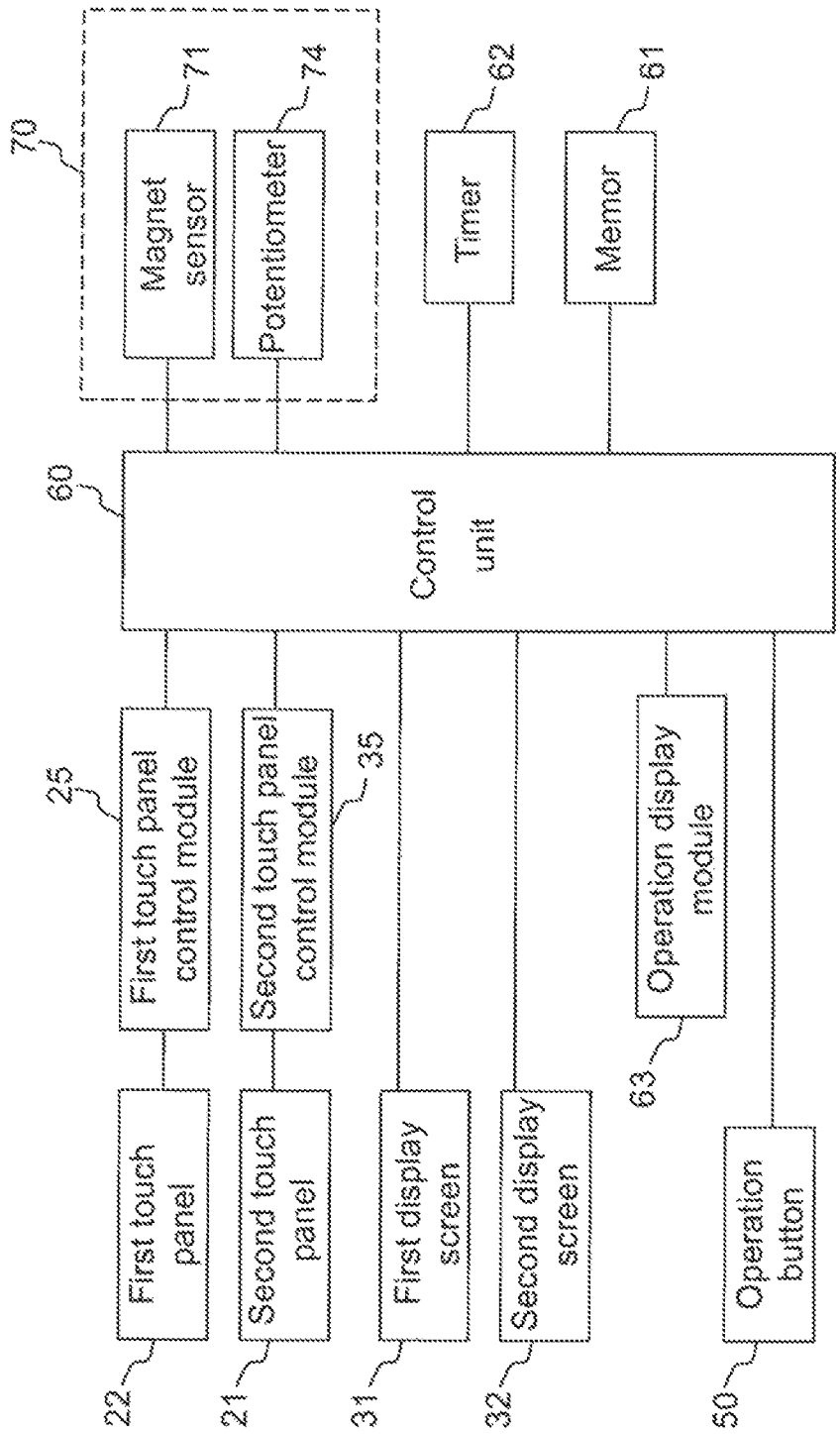

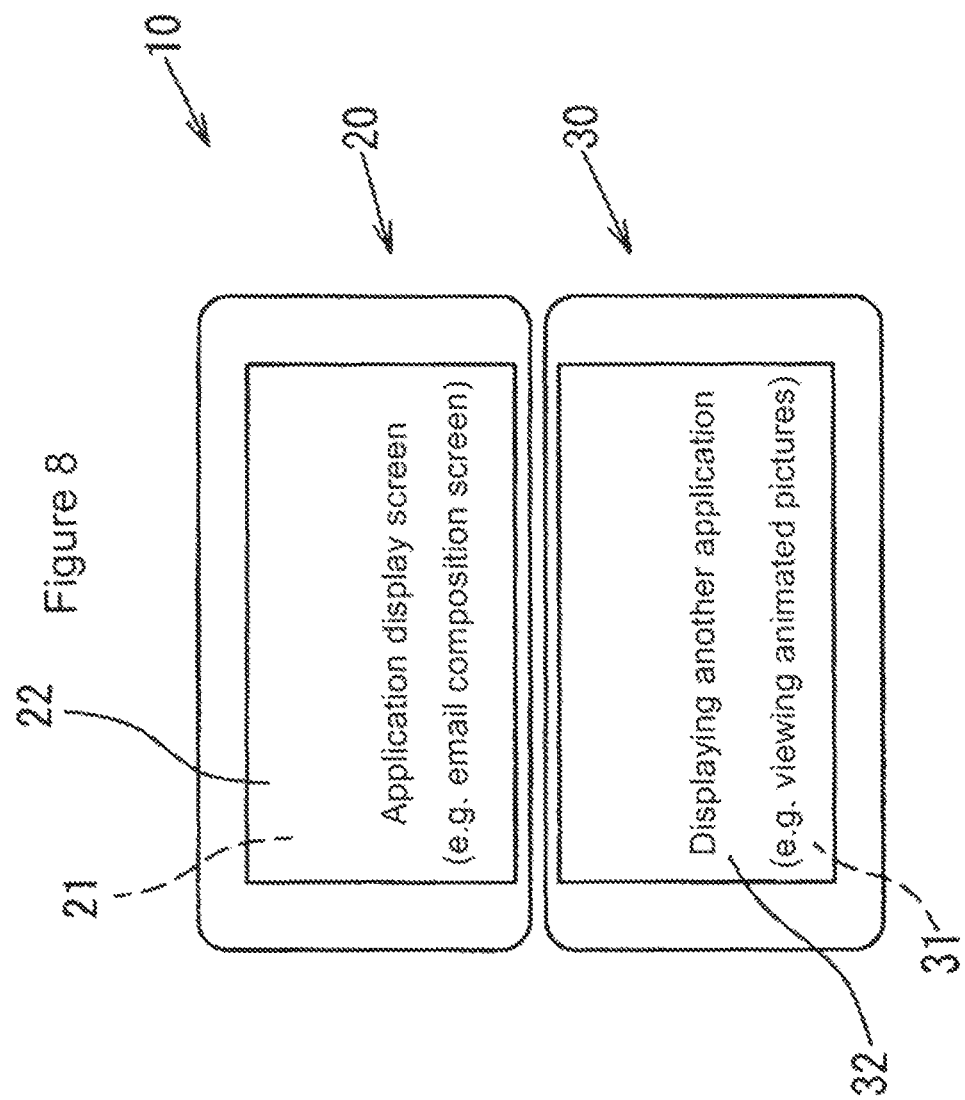

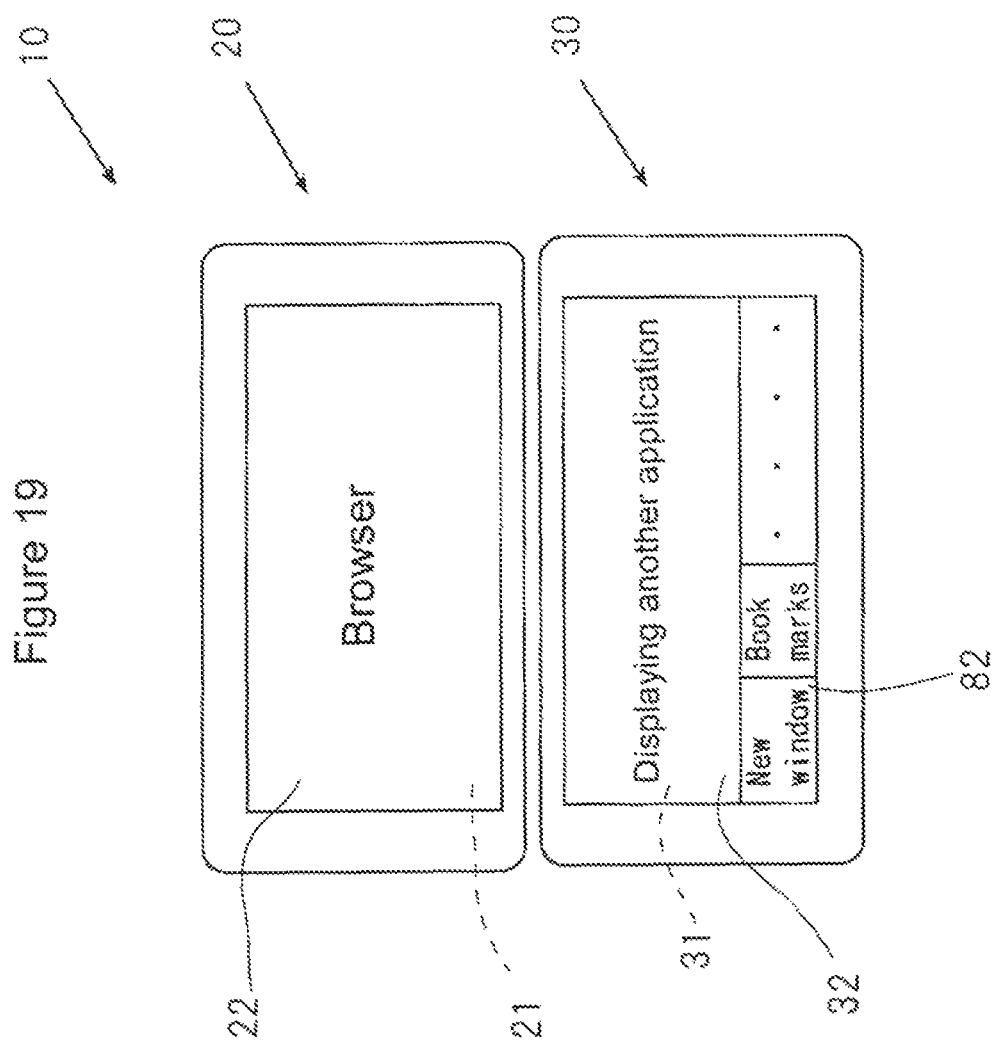

ELECTRONIC DEVICE

CROSS-REFERENCE TO RELATED APPLICATION

The present application claims priority under 35 U.S.C. §119 to Japanese Patent Application No. 2011-053835, filed on Mar. 11, 2011, entitled "ELECTRONIC DEVICE". The content of which is incorporated by reference herein in its entirety.

FIELD

Embodiments of the present disclosure relate generally to electronic devices, and more particularly relate to a mobile electronic device with improved operability.

BACKGROUND

Some electronic devices can display information regarding applications that are running on a display screen. An electronic device capable of starting applications simultaneously can display the applications running on a display screen. When a user operates an active application selected by her/him using a touch panel or the like, operable information such as a menu screen of an operation may overlap on the display screen on which the active application is being displayed. For example, while an application for viewing a motion picture is running, if the application is operated, operable information such as an operation menu screen may end up being displayed overlapping the motion picture, causing an inconvenience by forcibly interrupting viewing of the motion picture.

SUMMARY

An electronic device and methods are disclosed. The electronic device comprises a plurality of display screens, an operation module, and a control module. The operation module is operable to be operated by a user, and the control module is electrically coupled to the display screens and the operation module, and comprises an operation display module. The operation display module displays an active application from among a plurality of applications running on a first display screen from among the display screens. The operation display module further displays operable information related to the active application on a second display screen, when the operation module is operated by the user.

In this manner, an operation display module displays information operable with respect to an active application on an operable information-display screen which is different form an active application-display screen on which the active application is being displayed. Thus the active application-display screen is not overlapped by the operable information, thereby enhancing operability of the electronic device.

In an embodiment, an electronic device comprises a plurality of display screens, an operation module, and a control module. The operation module is operable to be operated by a user, and the control module is electrically coupled to the display screens and the operation module, and comprises an operation display module. The operation display module is operable to display an active application from among a plurality of applications running on a first display screen from among the display screens. The operation display module is further operable to display operable information related to the active application on a second display screen, when the operation module is operated by the user.

In another embodiment, an electronic device comprises a plurality of display screens, an operation module, and a control module. The operation module is operable to be operated by a user, and the control module is electrically coupled to the display screens and the operation module, and comprises an operation display module. The operation display module is operable to display a plurality of applications that are running on the display screens respectively. The operation display module is further operable to display operable information on a first display screen among the display screens on which an active application is displayed and the active application is displayed on a second display screen among the display screens with regard to the active application, when the operation module is operated.

In another embodiment, an electronic device comprises a plurality of display screens, an operation module, and a control module. The operation module is operable to be operated by a user, and the control module is electrically coupled to the display screens and the operation module, and comprises an operation display module. The operation display module is operable to continuously display an application on at least two of the display screens, when a user operates the application. The application is displayed on a first display screen among the at least two of the display screens and operable information is displayed on a second display screen among the at least two of the display screens.

In another embodiment, an electronic device comprises a first display screen, a second display screen, an operation module, a connection module, a shift detection sensor, a control module, and an operation display module. The first display screen and the second display screen are each operable to display information thereon. The operation module operated by a user. The connection module is operable to movably couple the first display screen and the second display screen, and move the second display screen between a location visually unrecognizable from outside an area overlapped with the first display screen and a location visually recognizable from the location. The shift detection sensor is operable to detect relative movement of the first display screen and the second display screen.

The control module is electrically coupled to the first display screen, the second display screen, the operation module, and the shift detection sensor, and is operable to start an application. The operation display module is operable to display information operable with respect to the application on the second display screen, while the application is in a displayed state on the first display screen, and when the shift detection sensor detects shifting of the second display screen from a location visually unrecognizable to a visually recognizable location.

In another embodiment, a method of controlling an electronic device comprising a plurality of display screens starts a plurality of applications to provide running applications. The method further displays the running applications on each of the display screens respectively, and receives an application selected by a user from among the applications to provide a selected application. The method further receives operations from an input device, and displays operable information on the second display screen with regard to the selected application.

In another embodiment, a method for controlling an electronic device comprising a plurality of display screens starts a plurality of applications, and displays the applications on a plurality of display screens respectively. The method further receives a user application selection to provide a selected application, and receives an operation indicating operable information. The method further displays the operable information on a first display screen on which an active application has been displayed while displaying the selected application on a second display screen.

In another embodiment, a method of controlling an electronic device comprising a plurality of display screens, starts an application, and displays the application continuously on a plurality of display screens. The method further receives an operation of the application from a user, and displays the application on a first display screen while displaying operable information on a second display screen in response to the operation.

In another embodiment, a method of controlling an electronic device comprising two display screens, displays an application on a first display screen, and detects a movement of a second display screen. The method further displays operable information with respect to the application on the second display screen, if the second display screen is moved from a first location invisible to a user to a second location visible to the user while the application is running on the first display screen.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

FIG. 7 is an illustration of an exemplary schematic functional block diagram of an electronic device according to an embodiment of the disclosure.

FIG. 8 is an illustration of exemplary display screens when two applications are being operated according to an embodiment of the disclosure.

FIG. 19 is an illustration of exemplary display screens including a first screen displaying a first application and a second screen displaying a second application and an operation menu according to an embodiment of the disclosure.

DETAILED DESCRIPTION

Figure 1:
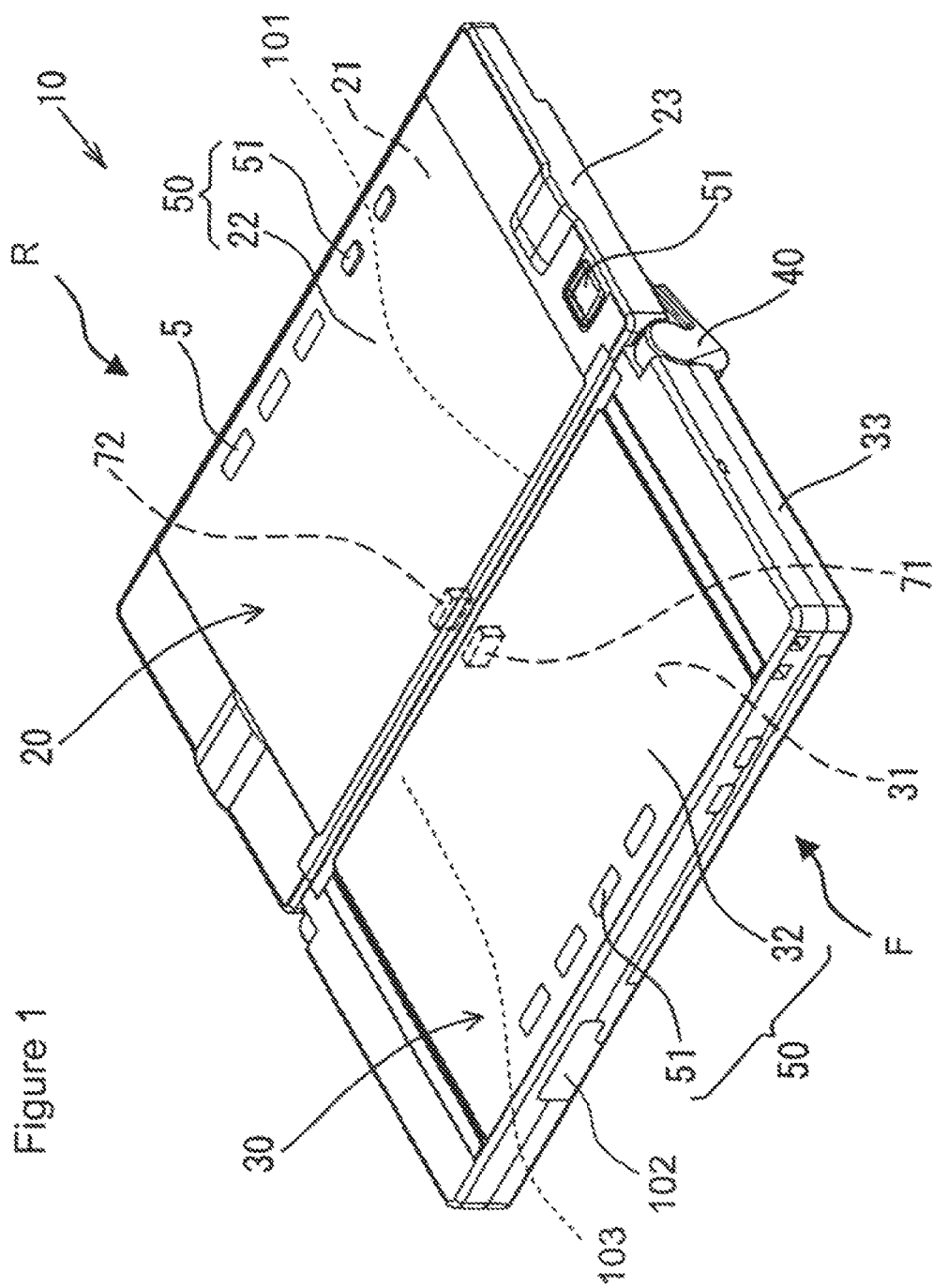
FIG. 1 is an illustration of a perspective view of an exemplary electronic device in a standard-flat state according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, GPS's or navigation systems, health equipments, and the like. As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Embodiments of the present disclosure are related to an electronic device comprising a plurality of display screens and an operation module such as a touch panel or the like. System and method according to embodiments of the disclosure enhance the operability of a running application.

In this manner, an operation display module displays information operable with respect to an active application on an operable information-display screen which is different form an active application-display screen on which the active application is being displayed. Thus the active application-display screen is not overlapped (hidden) by the operable information, thereby enhancing operability of the electronic device.

In an electronic device 10 according to an embodiment of the present disclosure, as illustrated in FIGS. 1 to 6, screens 21, 31 are capable of displaying information such as characters, graphics, images, motion pictures or the like. A plurality of display modules 20, 30, including touch panels 22, 32 are operable by being touched by a user on the surface of the display screen. The touch panels 22, 32, are coupled to each other and move by opening/closing or sliding relative to each other by a connection module 40.

FIGS. 1 to 6 show a state in a second display module 30 is arranged horizontally such that the second display screen 31 faces upward, and the facing direction of the second display module 30 is referred to as the "top" while the back face side thereof is referred to as the "bottom"; whereas, in FIGS. 1 to 4, the front left side of the figure is referred to as the "front" ("F") and the back right side thereof is referred to as the "rear" ("R"), while in FIGS. 5 and 6, the left side in the figure is referred to as the "front" ("F") and the right side thereof is referred to as the "rear" ("R"). As for "left" and "right," each means the left and the right directions viewed in the aforementioned "front" direction. With regard to the first display module 20 and the second display module 30, the end module on the front side shown in FIG. 1 is referred to as the "base end" 101 and the end module on the rear side is referred to as the "rear end" 102.

The display module 20 includes a display screen 21, which is capable of displaying various kinds of information, in a first case 23 having an upper face opened, thereby being recognizable visually from the opening side thereof. In the same manner, the display module 30 includes a display screen 21, which is capable of displaying various kinds of information, in a second case 33 having an upper face opened, thereby being recognizable visually from the opening side thereof.

Each of the first and second display modules 20, 30 may comprise a liquid crystal display as an example of a display screen. Each of the first and second display modules 20/30 is electrically coupled to a control module 60 (shown in FIG. 7) to display various kinds of information as described in more detail below. In FIG. 1, a display module positioned on the rear side R is referred to as a first display module 20 and a display module positioned on the front side F is referred to as a second display module 30.

The first display screen 21 includes a first touch panel 22 on the opening side thereof while the second display screen 31 includes a second touch panel 32 on the opening side thereof. The first and second touch panels 22, 32 are operable by being touched by a user. The first and second touch panels 22, 32 are arranged so as to close the opening of the first and second cases 23, 33 respectively and are transparently formed so that the display screens 21, 31 become visually recognizable. The first and second touch panels 22, 32 may comprise, for example but without limitation, a capacitive type touch panel, a resistive film type touch panel, or other types of touch panel.

The first and second touch panels 22, 32 are electrically coupled to the control module 60 via touch panel control modules 25, 35 respectively such that when a user operates the first and/or second touch panels 22, 32, the corresponding coordinate information is input into the control module 60 via first and second touch panel control modules 25, 35 respectively so as to be used for various kinds of operations or the like. The user can operate/activate the first and/or second touch panels 22, 32 by touching her/his finger thereon, or other means. Examples of operations by a user using the touch panels 22, 32 include tapping or double tapping by relatively brief contact with the touch panels 22, 32, or dragging, flicking, pinching, and long touching which involve longer contact time on the touch panels 22, 32 than the former.

A plurality of operation buttons 51 are arranged near the touch panels 22, 32 and/or on the peripheral surface of the case 33, forming an operation module 50 together with the touch panels 22, 32. A power supply button or the like is an example of an operation button 51. These operation buttons 51 are also electrically coupled to the control module 60 so as to make various kinds of controls possible by operating the operation buttons 51.

The first display module 20 and the second display module 30 are movable relative to each other by the connection module 40. The first display module 20 is made slidable and rotatable with respect to the second display module 30 in the electronic device 10 in the present embodiment.

The connection module 40 may couple an approximate center in a direction from the front F to the rear R on the back face side 101 of the first case 23 and a side 103 of the second case 33. The connection module 40 may be configured by a plurality of arms or other means. The first display module 20 is made slidable and rotatable by the connection module 40 in an approaching and separating directions with respect to the second display module 30, as described in more detail below. Alternatively, the connection module 40 may couple the first display module 20 and the second display module 30 by only sliding or only rotating the connection module 40.

The relative position of the first display module 20 and the second display module 30 may be detected by a shift detection sensor 70. The shift detection sensor 70 may comprise, for example but without limitation, a contact type switch that detects the approach or separation of the first display module 20 and the second display module 30, a non-contact type sensor comprising a magnet 72 and a magnet sensor 71, a potentiometer that detects the relative angle change between the first display module 20 and the second display module 30 or between the first and second display modules 20 30 and the connection module 40, or other sensors. The shift detection sensor 70 is also electrically coupled to the control module 60 (shown in FIG. 7).

In the shift detection sensor 70, a magnet 72 is embedded in the first display module 20 at the base end thereof while a magnet sensor 71 is housed in the second display module 30, which comes close to the magnet 72 in a standard-flat state, at a side end thereof. The shift detection sensor 70 can detect whether the first display module 20 and the second display module 30 are approaching or being separated. Thereby, whether the electronic device 10 is in the standard-flat state shown in FIGS. 1 and 5A or in a different state may be detected.

Figure 5A:
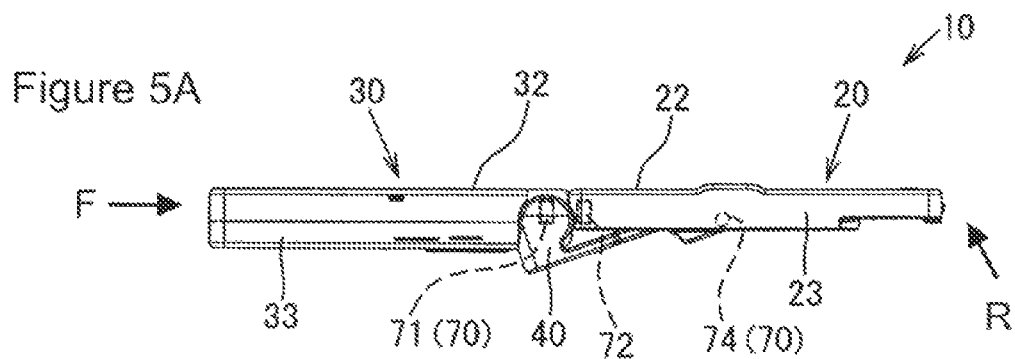
FIGS. 5A to 5C are illustrations of side views of the electronic device illustrated in FIGS. 1 to 3 to show an operation of changing states from 5A the standard-flat state illustrated FIGS. 1 to 5B the separated-flat state illustrated FIG. 2, then to 5C the tilt state illustrated FIG. 3 according to an embodiment of the disclosure.

As illustrated in FIG. 5A, a potentiometer 74 is arranged at the connection portion of the connection module 40 and the first display module 20 in order to detect the rotation of the first display module 20 with respect to the connection module 40.

FIG. 7 is an illustration of an exemplary schematic functional block diagram of an electronic device according to an embodiment of the disclosure.

The control module 60 is configured to support functions of the electronic device 10. The control module 60 may comprise a CPU or the like. The control module 60 may control operations of the electronic device 10 so that processes of the electronic device 10 are suitably performed. For example, the control module 60 may control starting various kinds of applications installed in the electronic device 10 and is also capable of simultaneously starting a plurality of applications.

The control module 60, may be implemented or realized with a general purpose processor, a content addressable memory, a digital signal processor, an application specific integrated circuit, a field programmable gate array; any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The control module 60 is electrically coupled to the first display screen 21 and the second display screen 31 and is capable of displaying information regarding each application.

The first touch panel 22 and the second touch panel 32 are electrically coupled to the control module 60 via a first touch panel control module 25 and a second touch panel control module 35 respectively. Inputs by a user from the first touch panel 22 and the second touch panel 32 are transmitted to the control module 60 via the touch panel control modules 25 and 35 respectively, and the control module 60 edits and/or operates information on the display screen 21 and 31 in response to the input.

The control module 60 is also electrically coupled to a memory 61, a timer 62, and an operation display module 63 as explained in more detail below as well as the operation buttons 51.

The memory 61 may be any suitable data storage area with suitable amount of memory that is formatted to support the operation of the electronic device 10. The memory 61 is configured to store, maintain, and provide data as needed to support the functionality of the electronic device 10 in the manner described below. In practical embodiments, the memory 61 may comprise, for example but without limitation, a non-volatile storage device (non-volatile semiconductor memory, hard disk device, optical disk device, and the like), a random access storage device (for example, SRAM, DRAM), or any other form of storage medium known in the art.

The first display module 20 and the second display module 30 coupled by the connection module 40 may be moved relative to each other by the following procedure.

FIG. 1 is an illustration of a perspective view of an exemplary electronic device in a standard-flat state according to an embodiment of the disclosure.

Figure 5B:
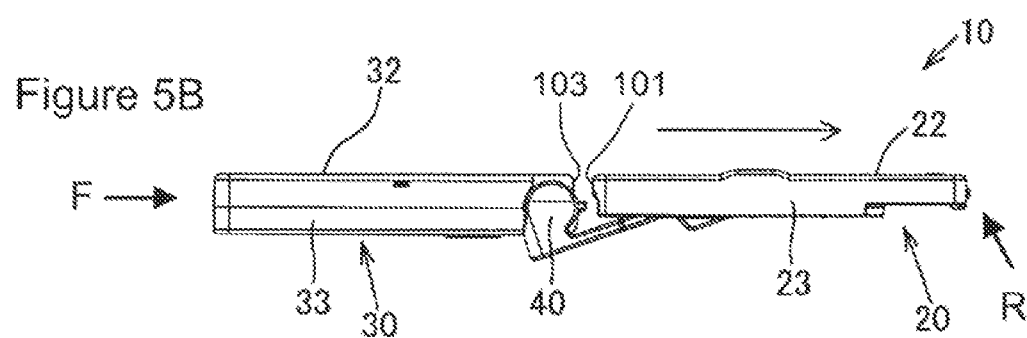

In FIG. 1, the first display module 20 and the second display module 30 have the first display screen 21 and the second display screen 31 on approximately the same plane while the base side 101 of the first case 23 and the side 103 of the second case 33 are adjacent to or in contact with each other (referring FIGS. 5A and 5B). The side view of the electric device illustrated in FIG. 1 is FIG. 5 A. This state is referred to as a "standard-flat state."

In the standard-flat state, the first display screen 21 and the second display screen 31 become continuous and may visually be recognized as one screen, while the first touch panel 22 and the second touch panel 32 may also be operated as if they are one continuous touch panel.

The information signal indicating that the display modules 20 and 30 are in the standard-flat state is detected by the magnet sensor 71 and may be transmitted to the control module 60.

Figure 2:
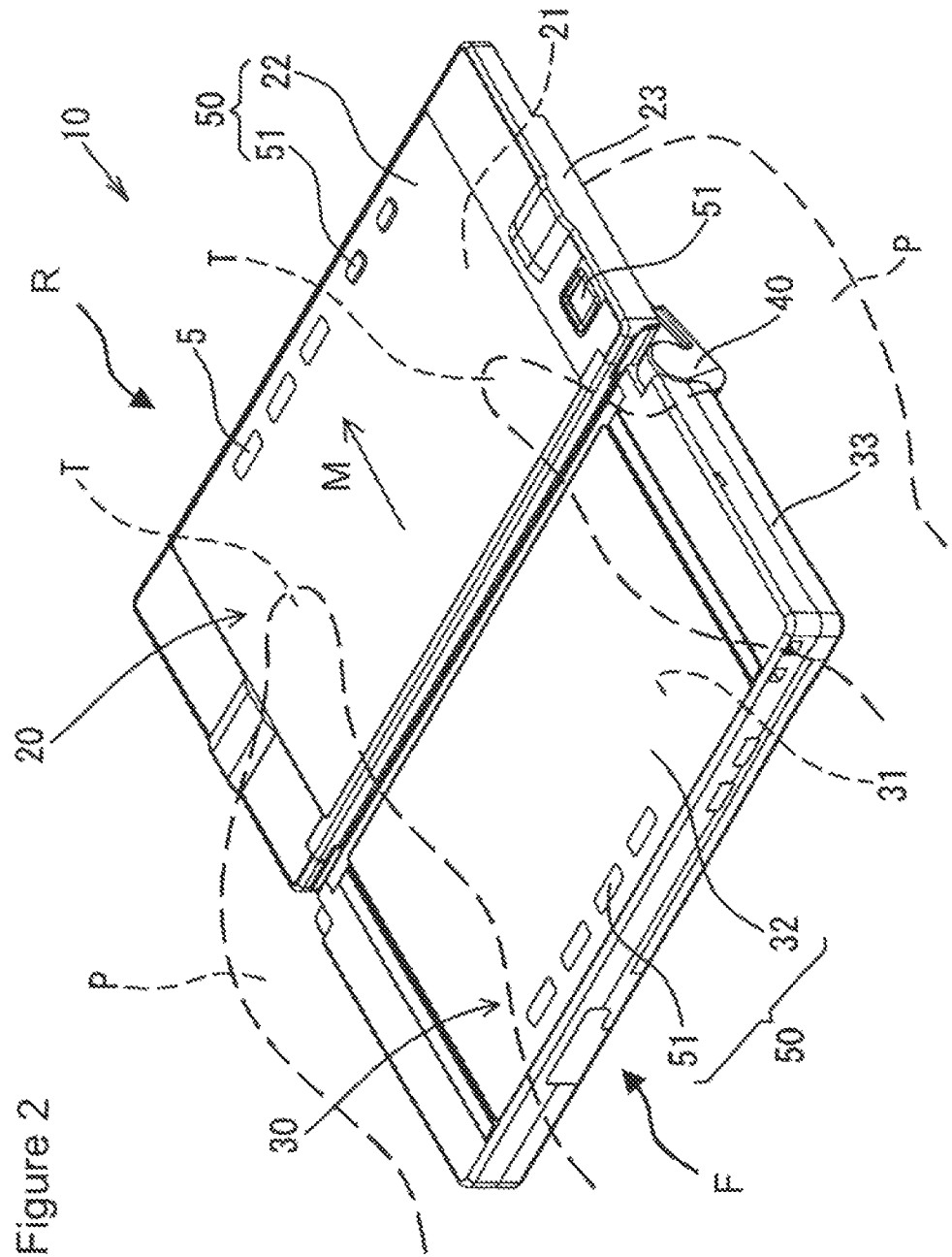
FIG. 2 is an illustration of a perspective view of the exemplary electronic device in a separated-flat state according to an embodiment of the disclosure.

As illustrated in FIG. 2, in the standard-flat state, when the user pushes the first touch panel 22 with both thumbs T backwards or in a separating direction M while supporting the back face of the second case 33 with four fingers of a hand P and supporting the second touch panel 32 with a ball, the first display module 20 slides into the separating direction M with respect to the second display module 30. This state is referred to as a "separated-flat state," the side view of which is shown in FIG. 5B.

Shifting from the standard-flat state to the separated-flat state is detected by the magnet sensor 71 and a signal indicating the shifting may be transmitted to the control module 60.

Figure 3:
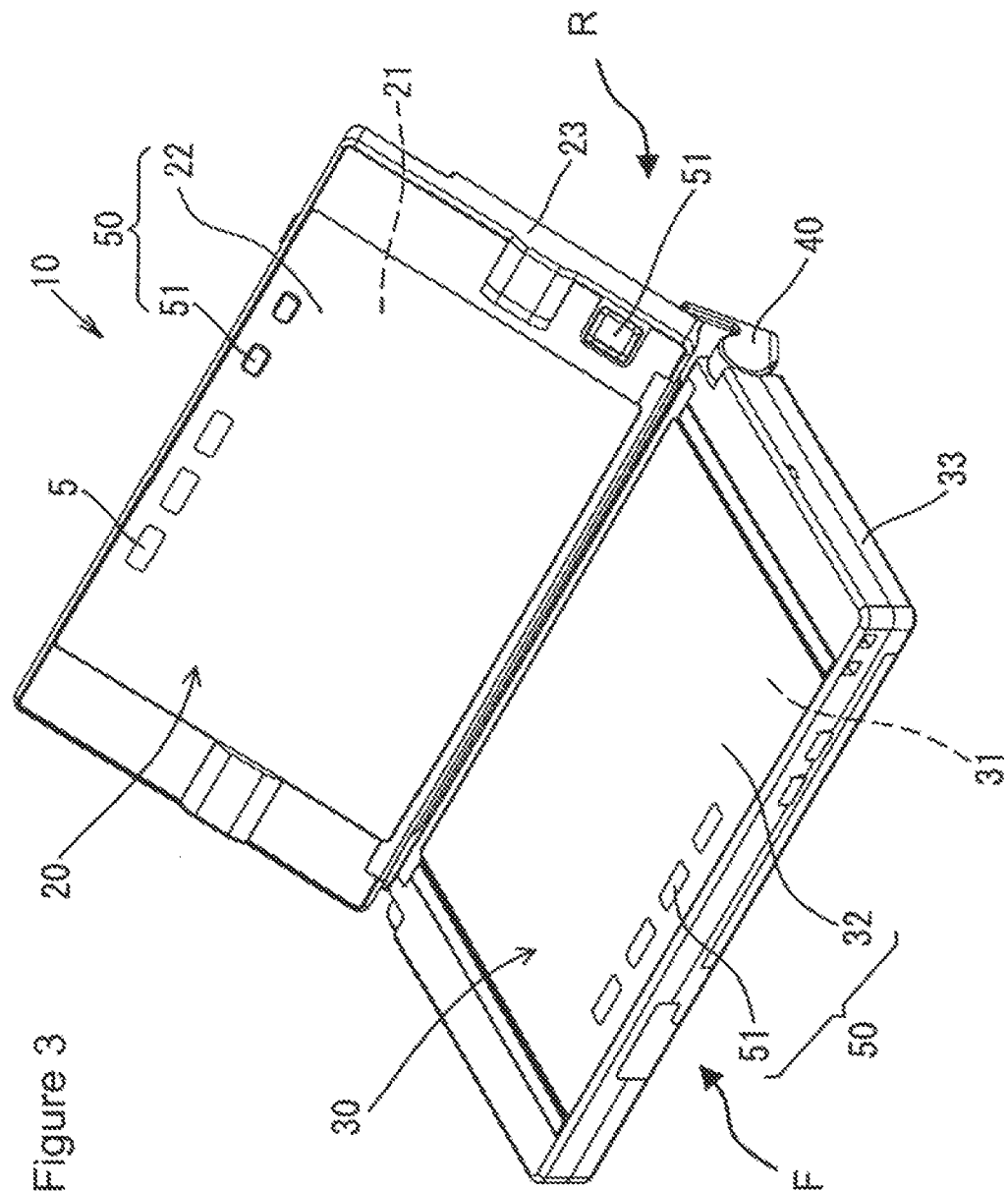
FIG. 3 is an illustration of a perspective view of the exemplary electronic device in a tilt state according to an embodiment of the disclosure.
Figure 5C:
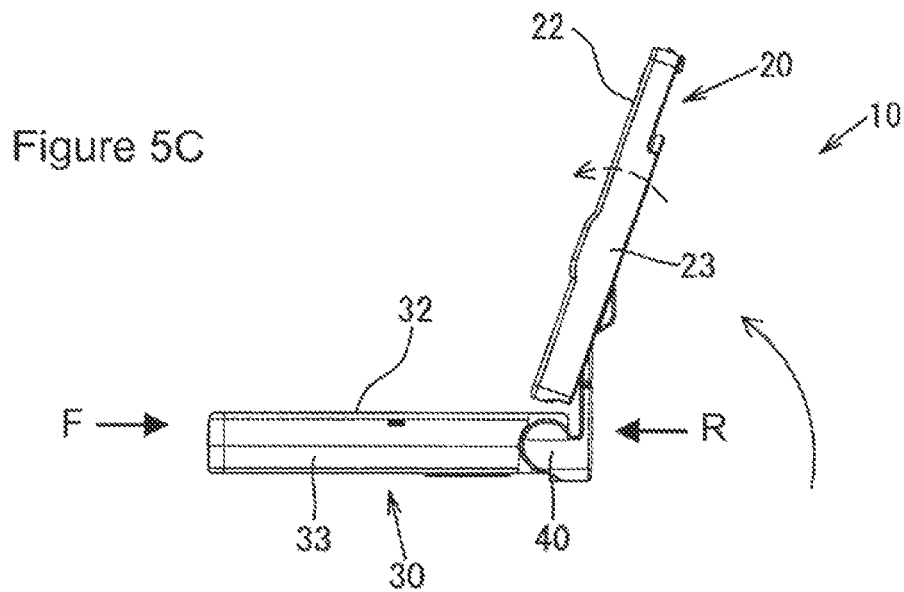

In the separated-flat state shown in FIG. 2, when the tip end side of the first display module 20 is pinched while pulling up the first display module 20 such that the first display screen 21 inclines in the front side direction, the first display screen 21 may be tilted with respect to the second display screen 31 as illustrated in FIGS. 3 and 5C. This state is referred to as a "tilted state." This operation may also be conducted by pinching and pulling the first display module 20 with the thumb and an index finger of the other hand while pressing the second case 33 with one hand.

As described above, the rotation of the first display module 20 is detected by the potentiometer 74 and a signal indicating the rotation may be transmitted to the control module 60.

While in a tilted state, because the first display screen 21 is tilted while horizontally retaining the second display screen 31, it is easy to visually recognize the first display screen 21. For example, displaying information such as characters on the first display screen 21, displaying a keyboard, for example, on the second display screen 31, and operating the second touch panel 32 make it possible to realize an electronic device 10 that is good in operability.

Figure 4:
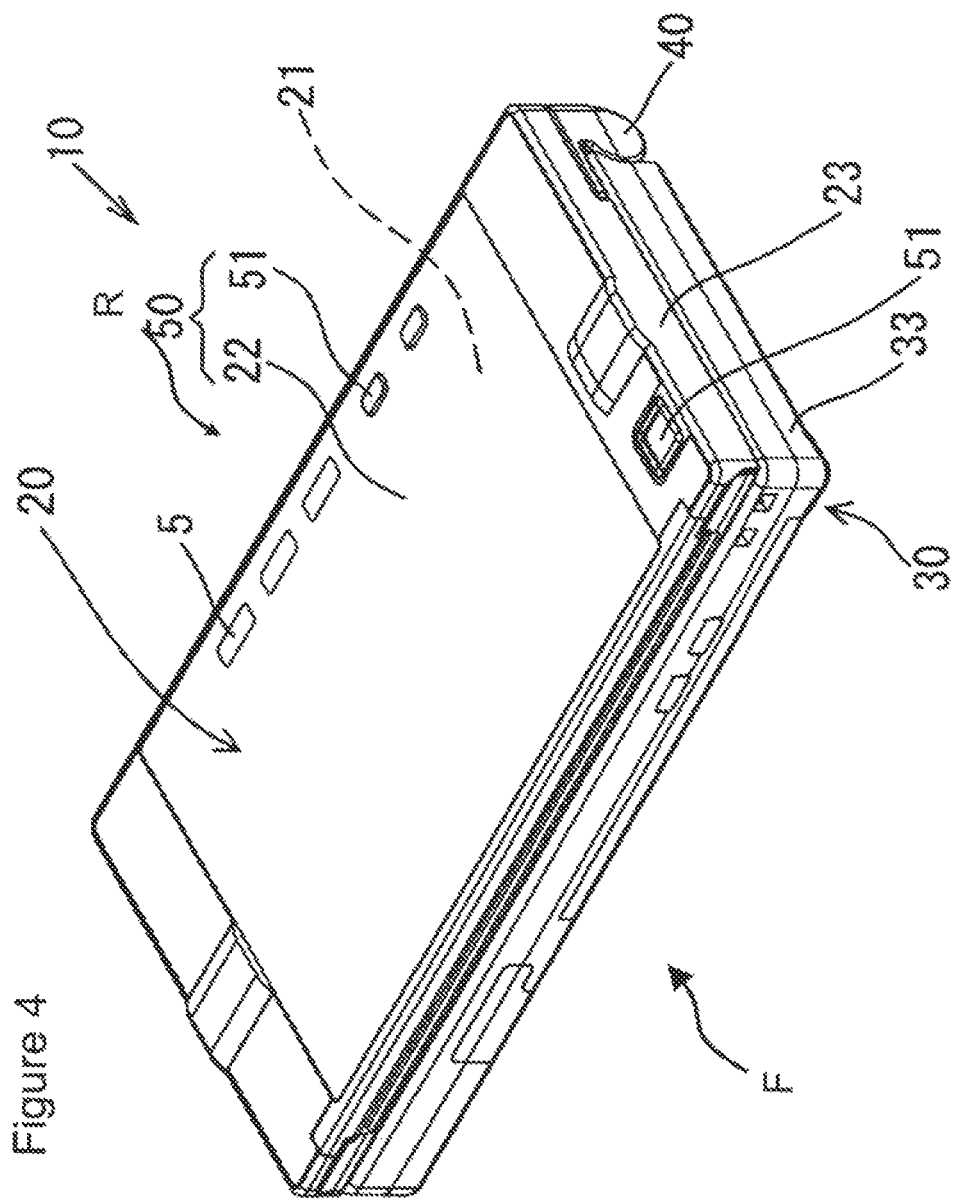
FIG. 4 is an illustration of a perspective view of the exemplary electronic device in a closed state according to an embodiment of the disclosure.
Figure 6A:
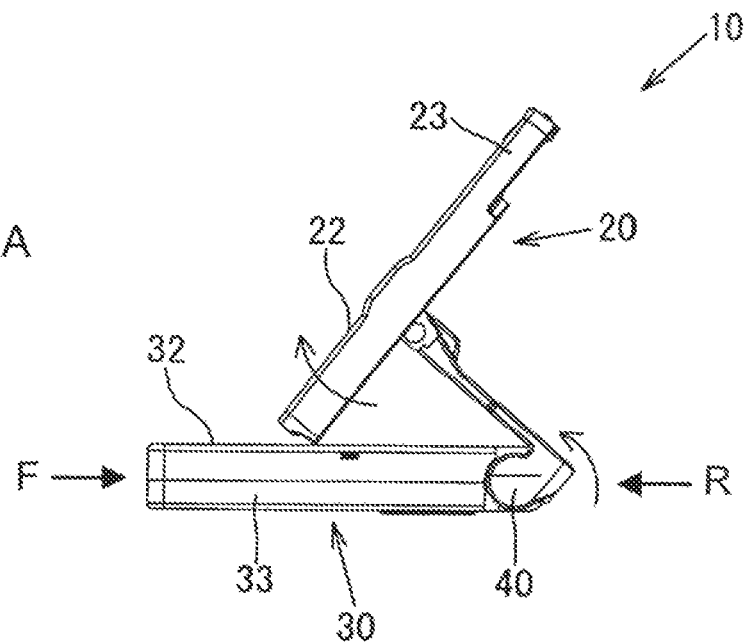
FIGS. 6A to 6C are illustrations of side views of the electronic device to show an operation of further changing states from 6A forwarded-tilt state to 6B forwardly-slid state 6C the closed state illustrated FIG. 4 according to an embodiment of the disclosure.
Figure 6B:
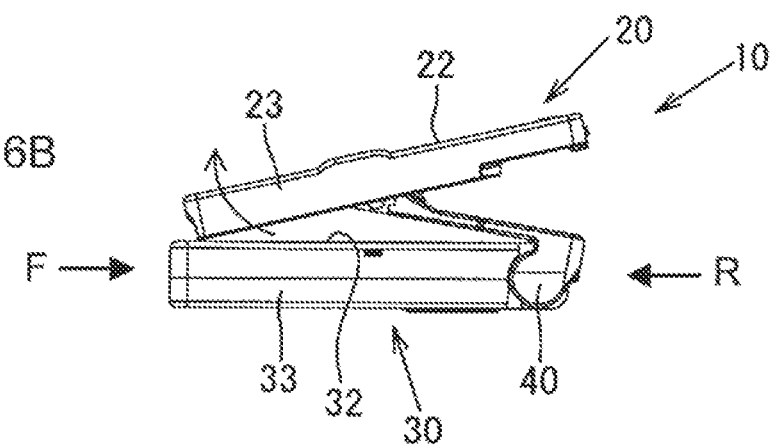
Figure 6C:
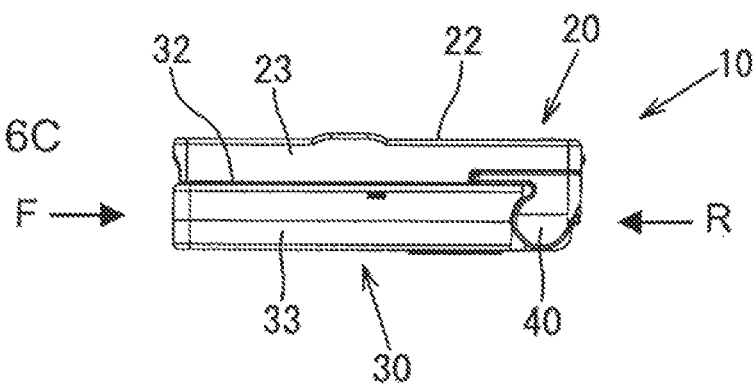

The first display module 20 and the second display module 30 may be brought into a closed state with the first display module 20 on the top side such that the second display module 30 is no longer visually recognized as illustrated in FIG. 4 and FIG. 6C by pushing down the first display module 20 toward the back with respect to the connection module 40 in the tilted state as illustrated FIG. 6A, and further pressing down the first display module 20 downwards such that the tip end of the first display module comes close to the tip end of the second display module 30 as illustrated FIG. 6B.

As described above, the rotation of the first display module 20 may be detected by the potentiometer 74 and a signal indicating the rotation may be transmitted to the control module 60.

In a closed state, only the first display module 20 may be visually recognized and only the first touch panel 22 as well as the operation buttons 51 exposed on the surface may be operable, while the second display module 30 is no longer visually recognizable and the second touch panel 32 is inoperable as well.

The closed state is suitable not only for single-screen use, but also for disuse and for carrying, allowing the electronic device 10 to be downsized.

The reverse operation of the above involves shifting from the closed state to a tilted state or further to a standard-flat state.

In general operations, the control module 60 is capable of displaying information on the first display screen 21 or the second display screen 31, controlling various kinds of operations based on inputs from the first touch panel 22 or the second touch panel 32 and operation buttons 51, and switching information displayed on the first display screen 21 with information displayed the second display screen 31 based on the shift detection sensor 70.

In FIG. 8, after the control module 60 starts a plurality of applications (two applications in the figure), each application is displayed on the first display screen 21 (step 1 in the flowchart shown in FIG. 9) and the second display screen 31. When a user tries to operate an application such as an application that is displayed on the first display screen 21 by touching the touch panel 22 or the operation buttons 51 (step 2), the operation display module 63 displays information operable by the operation on the other display screen, which is the second display screen 31 (step 3).

The active application is an application operable or being operated by the user. When a plurality of applications are running on the plurality of display screens 21, 31 described herein, switching of the active application may be conducted by operations such as tapping with respect to the touch panels 22, 32. More specifically, when the application on the first display screen 21 is active, operations such as tapping on the second touch panel 32 switches the application on the second display screen 31 to be active.

Arranging a display module such as an LED on the peripheral rim of the display screens 21, 31 and causing the display module of a display screen on which an active application is running to light up or blink makes it easier to verify which application on either display screen 21 or 31 is active. It is also possible to cause a display screen 21 or 31 on which an active application is running or a display screen 21 or 31 on which a non-active application is being displayed to display a mark or other indicator.

Specifically, an operation menu screen may be used as an example for operable information to be displayed by the operation display module 63. If email software is taken as an example of an application, when the application by which email is being composed is displayed on the first display screen 21, for example, receiving, transmitting, and attaching operations are displayed on the operation menu screen.

Figure 9:
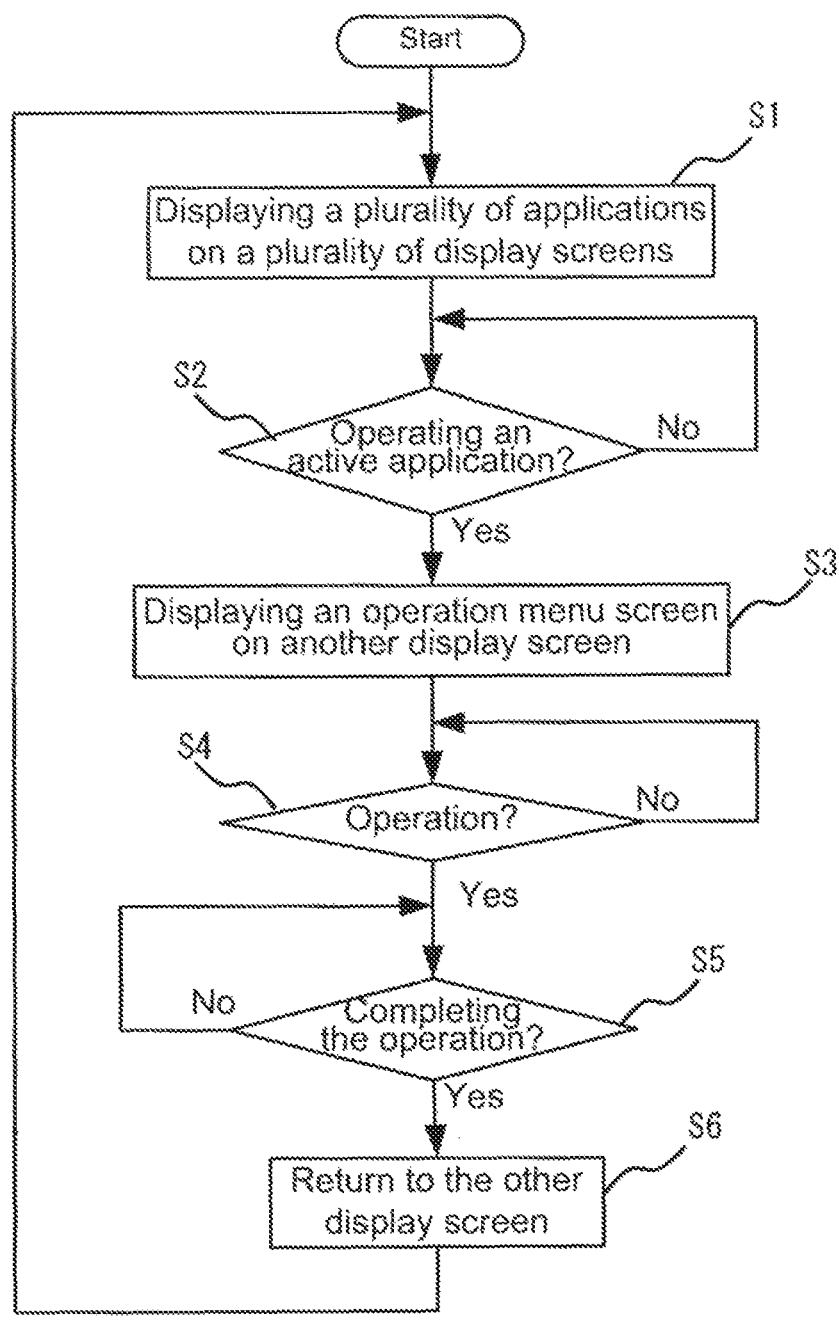
FIG. 9 is an illustration of an exemplary flow diagram showing a process to operate applications according to an embodiment of the disclosure.
Figure 10:
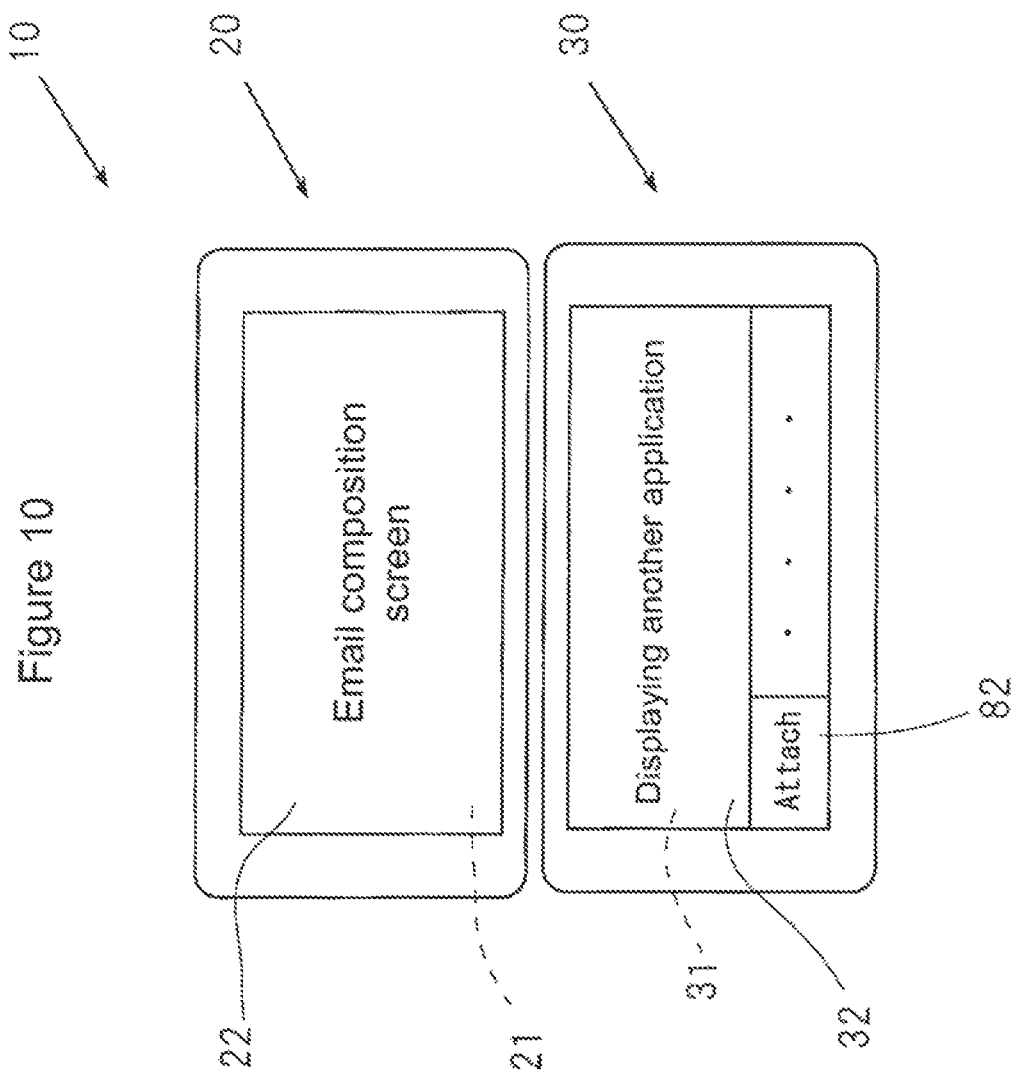
FIG. 10 is an illustration of exemplary display screens including a first screen that shows an operation menu screen for an active application and a second screen for displaying a non-active application according to an embodiment of the disclosure.

As illustrated in FIG. 10, an operation menu screen is displayed on the second display screen 31 if an operation or the like is performed on the touch panel 22 illustrated in FIG. 9 by the user. As illustrated in FIG. 10, an operation menu screen 82 related to the email operation may be partially displayed at the lower end of the second display screen 31.

As another application to be displayed on the second display screen 31, in case of software for viewing motion pictures, operations to be displayed on an operation menu screen comprise, for example, volume, play, stop, pause, and other function related to motion picture of a motion picture. In case of browser software, operations displayed on an operation menu screen comprise, for example, display of a new browser, bookmarks, addition of bookmarks, display of page information, download, and other function related to a browser software.

As a result of operating the operation menu screen displayed on the second display screen 31 by the user (step 4) as illustrated in FIG. 10, the control module 60 executes the corresponding operation, closes the operation menu screen when the operation is complete (step 5), and brings the display back to the information of the application that was being displayed on the second display screen 31 prior to the operation (step 6).

Whereby, because the display screen 21 of an active application is not hidden/overlapped by the operation menu screen, the user is able to comfortably continue the operation and further, because mixing up with an operation menu screen of another application is prevented, the operability may be enhanced.

Figure 11:
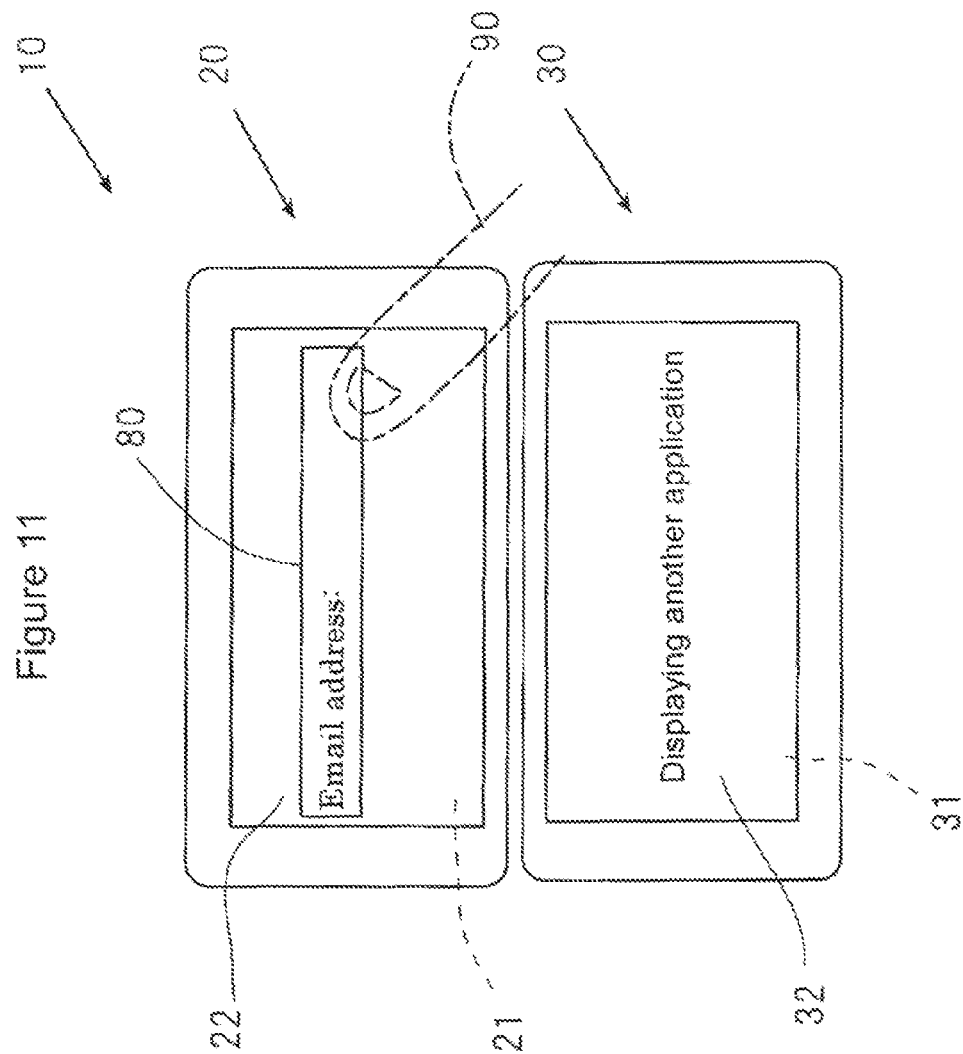
FIG. 11 is an illustration of exemplary display screens including a first screen that shows a browser including an email-address input section according to an embodiment of the disclosure.

In an embodiment, in the electronic device 10 illustrated in FIG. 11, an input region 80 in which an email address may be input when a browser is running is displayed on the first display screen 21 and another application is displayed on the second display screen 31.

Figure 12:
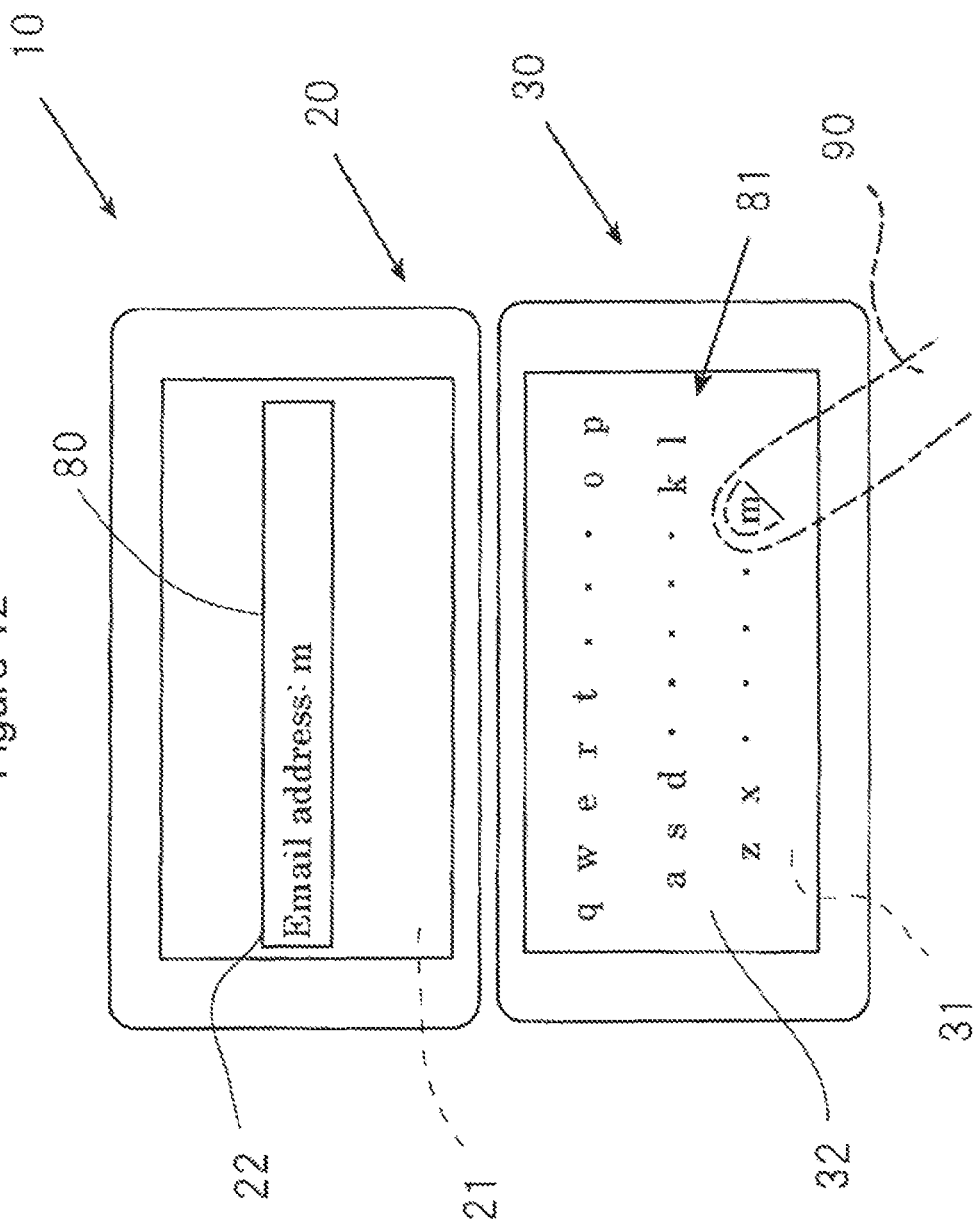
FIG. 12 is an illustration of exemplary display screens including a second screen that displays a key pad while a first screen displays a screen including an email-address input section according to an embodiment of the disclosure.

In this state, when the user conducts an operation such as tapping within the input region 80 using a finger 90 or other means of activation as illustrated in FIG. 11, the operation display module 63 may also display, as illustrated in FIG. 12, on the second display screen 31, a software keyboard 81 on which a keyboard function may also be displayed as operation information instead of another application.

This makes it possible for the user to operate the software keyboard 81 displayed on the second display screen 31 on the second touch panel 32 and input an email address in the input region 80 that is displayed on the first display screen 21.

Figure 13:
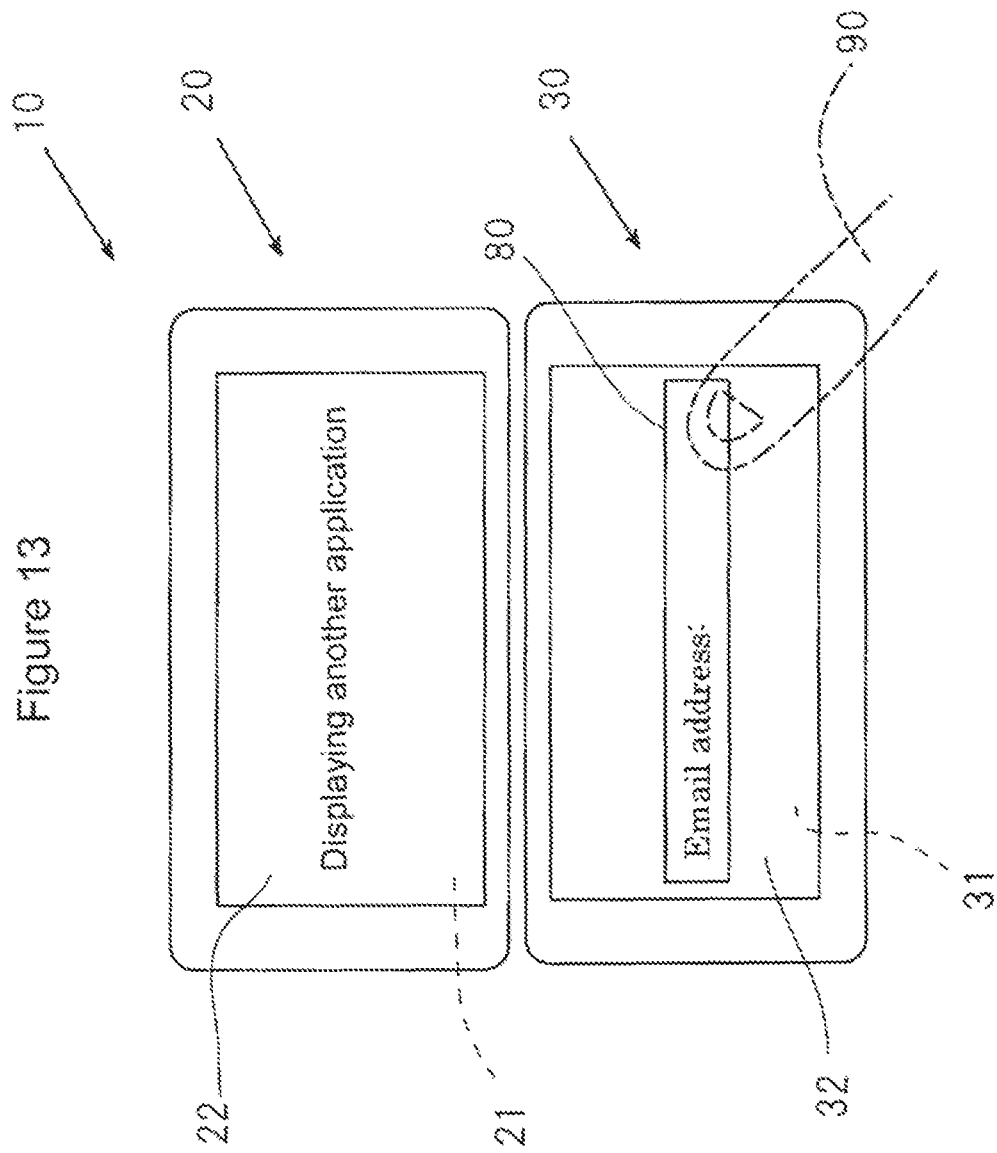
FIG. 13 is an illustration of exemplary display screens including a second screen that shows a browser including an email-address input section according to an embodiment of the disclosure.

If the input region 80 in which an email address may be input is displayed while a browser is running on the second display screen 31 as illustrated in FIG. 13, when the user operates the input region 80 by tapping or the like, the software keyboard 81 may be displayed on the first display screen 21. However, if the first touch panel 22 is touched, the second display screen 31 ends up being covered by a hand, making it difficult to visually recognize the input region 80. In addition, the second touch panel 32 has better operability. Therefore, in the same manner as FIG. 12, as an email address may also be input by displaying the input region 80 on the first display screen 21, displaying the software keyboard 81 on the second display screen 31, and operating the user operation on the second touch panel 32. An example method for controlling an electronic device comprising a plurality of display screens comprises: starting a plurality of applications; displaying the applications on a plurality of display screens respectively; receiving an application selected by a user from among the applications to provide a selected application; receiving an operation indicating operable information with regard to the selected application; and displaying the operable information on a first display screen on which the selected application has been displayed while displaying the selected application on a second display screen.

The operation is conducted by the user on an application on the first display screen 21 in the above embodiment. However, when an application on the second display screen 31 on the lower side is operated, it is also possible to display the operation menu screen on the first display screen 21 on the upper side.

Figure 14:
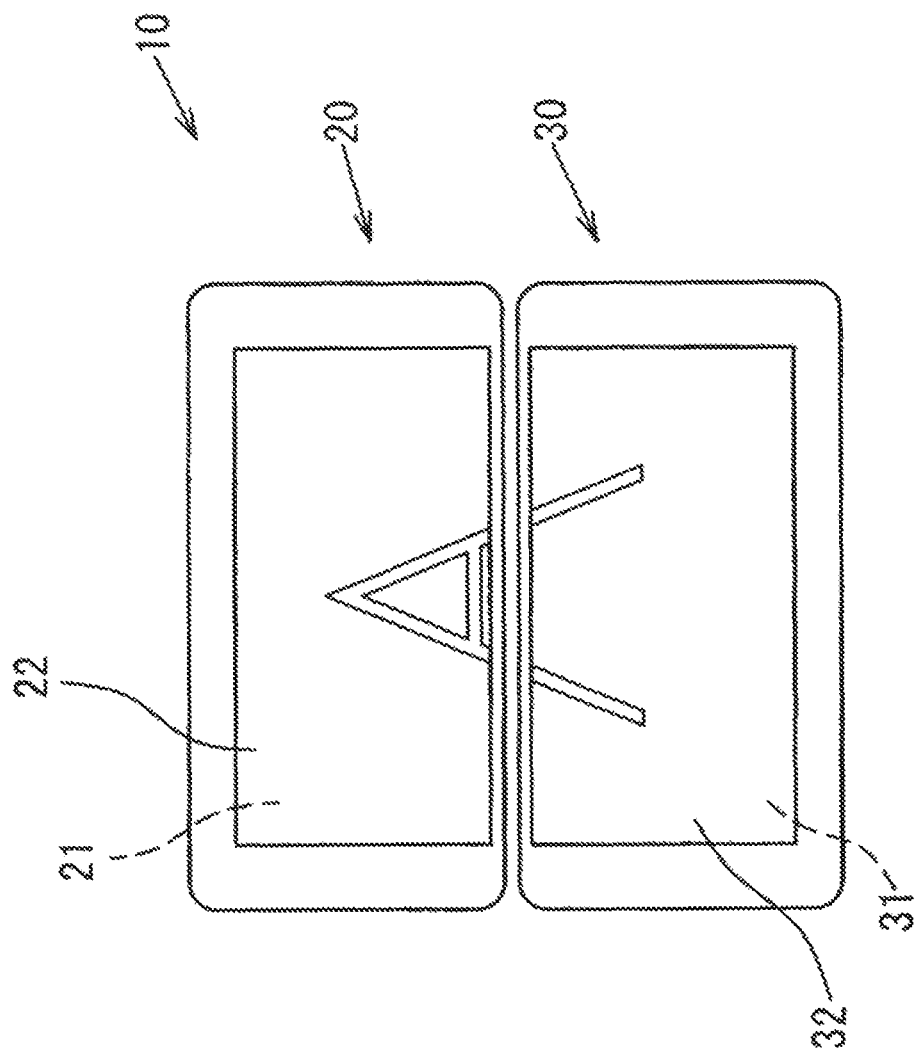
FIG. 14 is an illustration of exemplary display screens operating as one display screen to display an application according to an embodiment of the disclosure.
Figure 15:
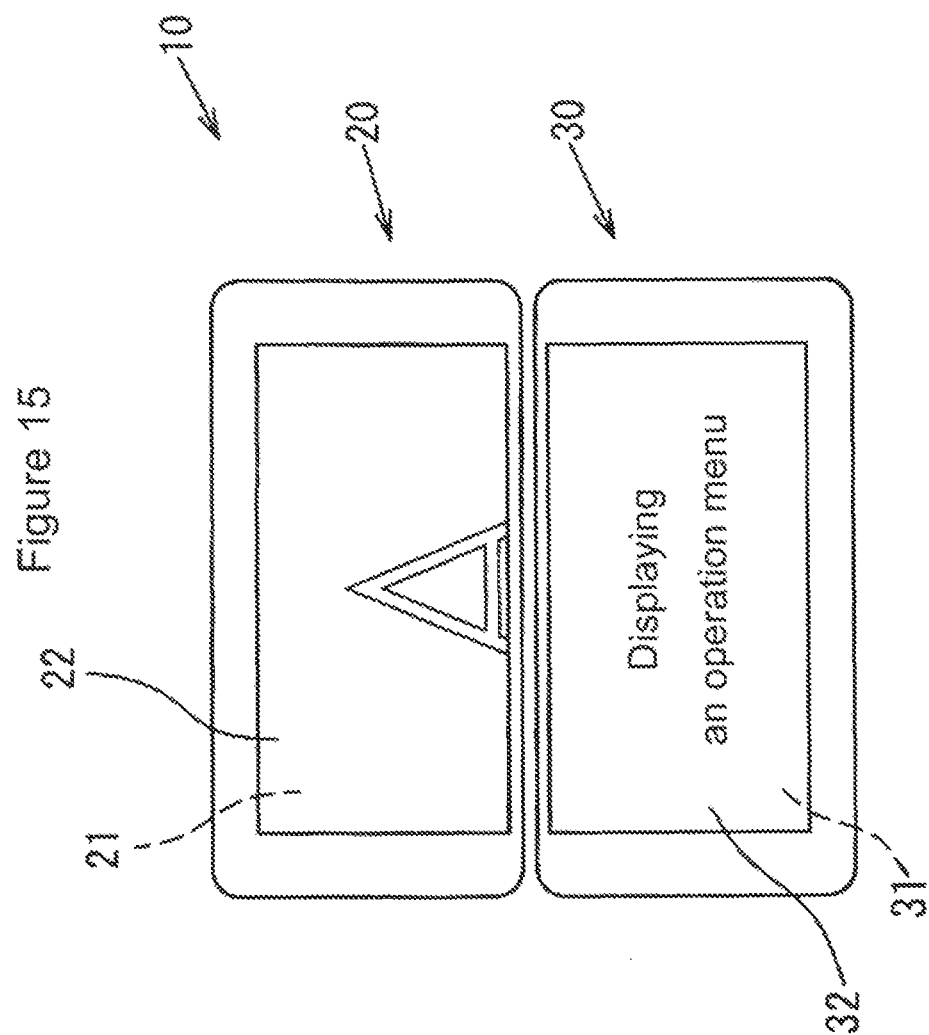
FIG. 15 is an illustration of exemplary display screens displaying the application shown in FIG. 14 on the first screen and displaying an operation screen on the second screen according to an embodiment of the disclosure.

In an embodiment, the first display screen 21 and the second display screen 31 may be used as if they are one screen and one application is displayed continuously on the first display screen 21 and the second display screen 31 as illustrated in FIG. 14. If the user operates the application, the control module 60 is also capable of displaying an operation menu screen on one of the display screens such as the second display screen 31 as illustrated in FIG. 15.

Embodiments described above can be applicable to any electronic device 10 comprising a plurality of display screens without being limited to those with display screens that are relatively slidable and rotatable with respect to each other. For example, the application is also possible with those electronic devices having relatively sliding or rotating display screens or electronic devices and the like in which a plurality of display screens are arranged side by side on one case.

Figure 16:
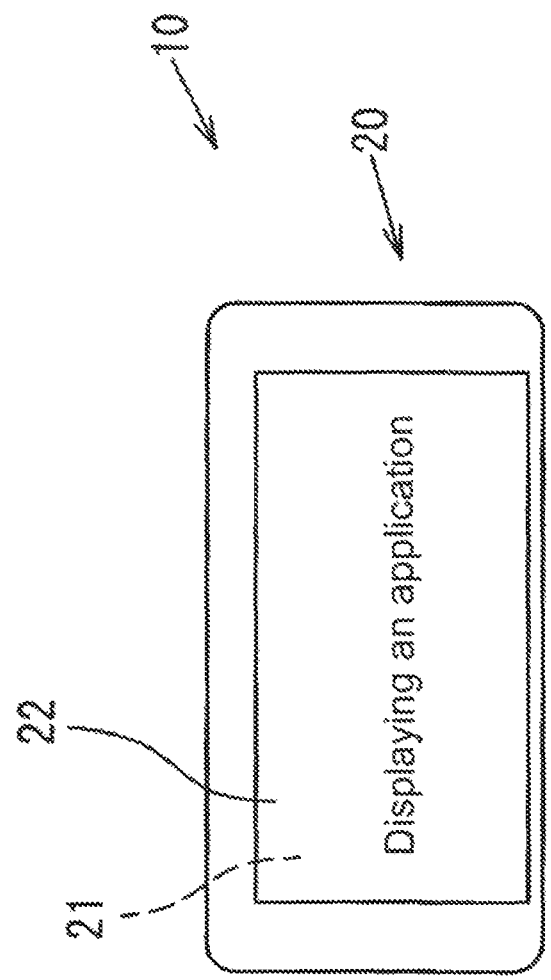
FIG. 16 is an illustration of an exemplary display screen to display an application in the closed state according to an embodiment of the disclosure.
Figure 17:
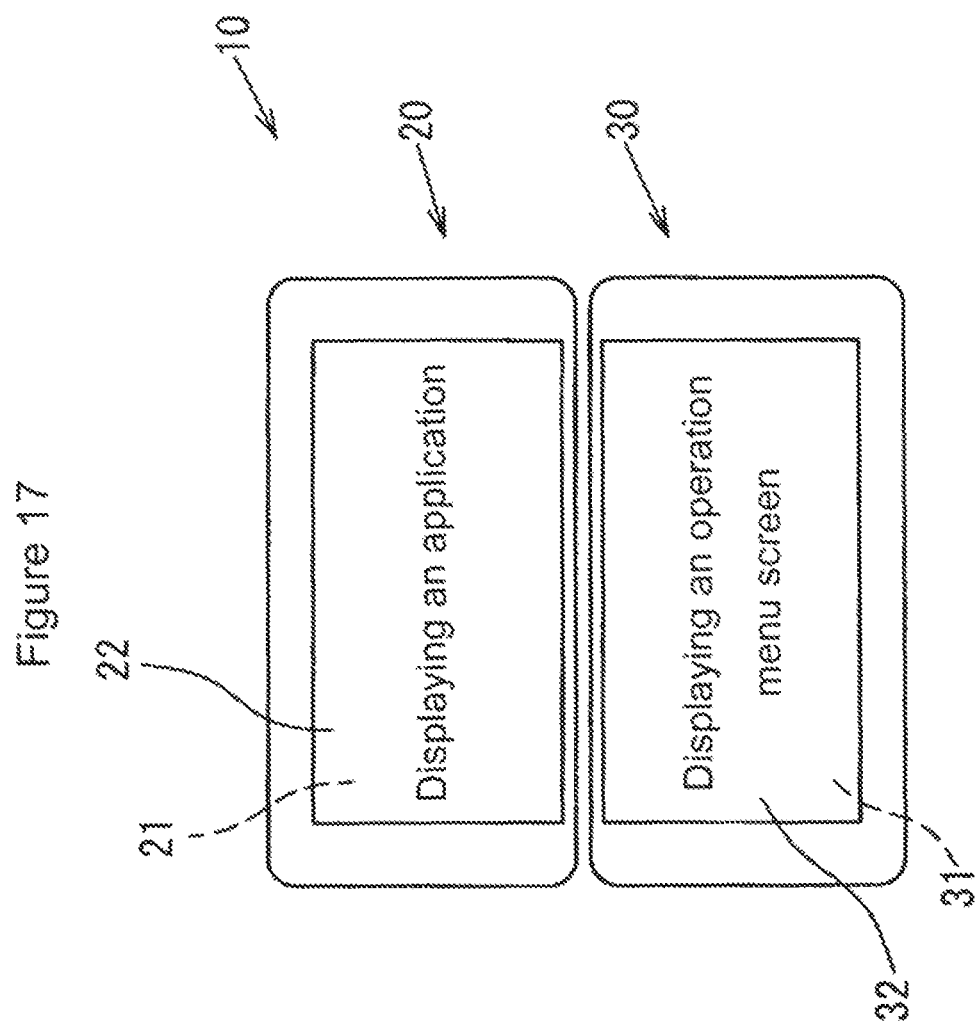
FIG. 17 is an illustration of exemplary display screens in the standard-flat state to display the application in the first screen and an operation screen in the second screen after opening up from the closed state shown in FIG. 16 and according to an embodiment of the disclosure.

As described in the context of discussion of FIG. 4, while in a closed state, only the first display screen 21 is visually recognizable (FIG. 16). Subsequently, if the shift detection sensor 70 such as a magnet sensor 71 or potentiometer 74 detect that the second display screen 31 has been pulled out to a tilted state (FIG. 3) or a standard-flat state (FIG. 1), making the second display screen 31 visually recognizable, the control module 60 may also display, on the second display screen 31, an operation menu screen of an active application displayed on the first display screen 21 as illustrated in FIG. 17. Whereby, when the user operates the first display screen 21, the operation menu screen becomes visually recognizable by pulling out the second display screen 31, making it possible to enhance the operability.

Figure 18:
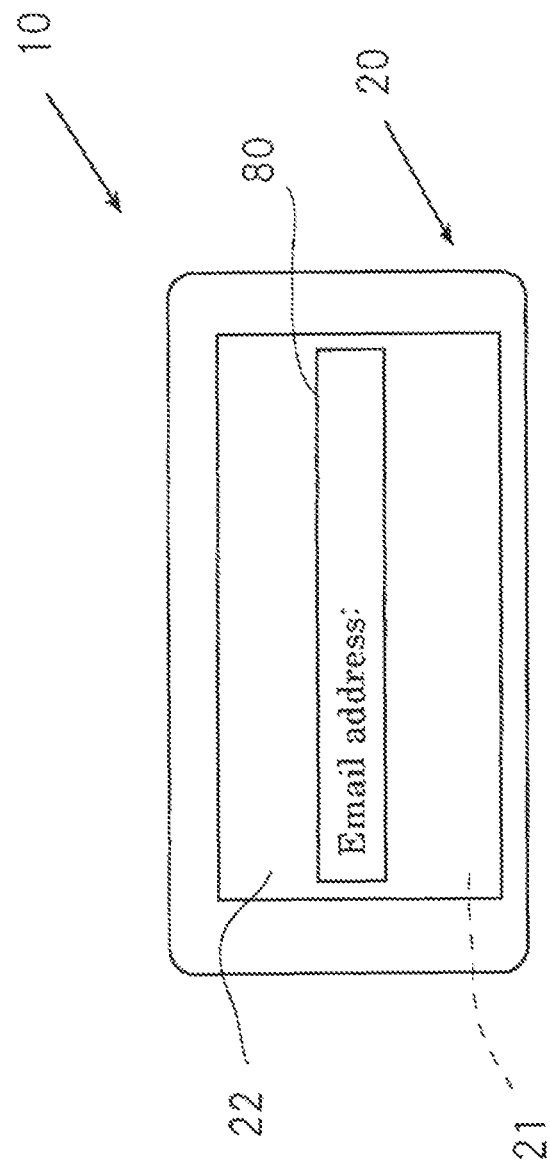
FIG. 18 is an illustration of an exemplary display screen including a first screen that shows a browser including an email-address input section in the closed state according to an embodiment of the disclosure.

As a specific embodiment of FIG. 16, while in a closed state, if the input region 80 in which an email address can be input is displayed when a browser is running on the first display screen 21 as illustrated in FIG. 18, in the event of pulling out the second display screen 31 to a state indicated by a tilted state (FIG. 3) or a standard-flat state (FIG. 1), the operation display module 63 may also display the software keyboard 81 displaying a keyboard function as operable information on the second display screen 31 instead of another application as illustrated in FIG. 12.

Consequently, the user is able to input an email address in the input region 80 displayed on the first display screen 21 by operating, using the second touch panel 32, the software keyboard 81 displayed on the second display screen 31 that has been pulled out.

In this case, operable information of an application displayed on one display screen 21 is displayed using the full screen of the other display screen 31; however, it is also possible to display an operation menu screen 82 on a part of the other display screen 31.

In an embodiment, the operation menu screen 82 is displayed at the lower end of the display screen 31 as illustrated in FIG. 19. Whereby, there is an advantage of making it possible to display the operation menu screen 82 without hiding the application on the other display screen 32. FIG. 19 shows an operation example of a display of a new browser (new window) and bookmarks on the operation menu screen 82.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An electronic device comprising:
a plurality of display screen areas comprising a first display screen area and a second display screen area positioned below the first display screen area;
an operation module comprising:
a first operation module corresponding to the first display screen area operable to be operated by a user, comprising a first touch panel area; and
second operation module corresponding to the second display screen area operable to be operated by a user, comprising a second touch panel area; and
a control module electrically coupled to the first and second display screen areas, the first and second touch panel areas and the operation module, and operable to:
display a first application of a plurality of applications on the first display screen area and display a second application of the plurality of applications on the second display screen area; and
in response to a touch to a predetermined input region of the displayed first application on the first display screen area, then replace the display of the second application on the second display screen area with a display of a software keyboard; and
in response to a touch to a predetermined input region of the displayed second application displayed on the second display screen area, then replace the display of the first application with a display of the second application on the first display screen area, and display the software keyboard on the second display screen area.

2. The electronic device of claim 1, wherein the first application or the second application is a text editing application.

3. The electronic device of claim 1, wherein the first application or the second application is email software, browser software or video viewer software.

4. An electronic device comprising:
   a plurality of display screens comprising a first display screen and a second display screen positioned below the first display screen;
   an operation module operable to be operated by a user, the operation module comprising: a first touch panel for accepting touch inputs on the first display screen, and a second touch panel for accepting the touch inputs on the second display screen; and
   a control module electrically coupled to the first and second display screens, the first and second touch panels and the operation module, and operable to:
   display a plurality of applications comprising at least a first application on the first display screen and at least a second application on the second display screen;
   and
   in response to a touch to a predetermined input region of the displayed first application on the first display screen, then replace the display of the at least the second application on the second display screen with a display of a software keyboard; and
   in response to a touch to the predetermined input region of the displayed second application on the second display screen, then replace the display of the at least the second application on the second display screen with a display of the software keyboard, and replace the display of the at least the first application on the first display screen with a display of the at least the second application.

5. The electronic device of claim 4, wherein the first application or the second application is a text editing application.

6. The electronic device of claim 4, wherein the first application or the second application is email software, browser software or video viewer software.

7. A method for displaying screens on an electronic device, comprising:
   displaying a first application of a plurality of applications on a first touch screen display area;
   displaying a second application of the plurality of applications on a second touch screen display area positioned below the first touch screen display area;
   in response to a touch to a predetermined input region of the displayed first application on the first display screen area, then replacing the second application on the second touch screen display area with a software keyboard; and
   in response to a touch on the predetermined input region of the displayed second application on the second display screen area, then replacing the first application on the first touch screen display area with the second application, and replacing the second application on the second touch screen display area with the software keyboard.

8. The method of claim 7, wherein the first application or the second application is a text editing application.

9. The method of claim 7, wherein the first application or the second application is email software, browser software or video viewer software.

* * * * *